April 1, 1924.
L. P. VAN HALL ET AL
BUTTONHOLE CUTTING ATTACHMENT
Filed April 13, 1923
1,489,176
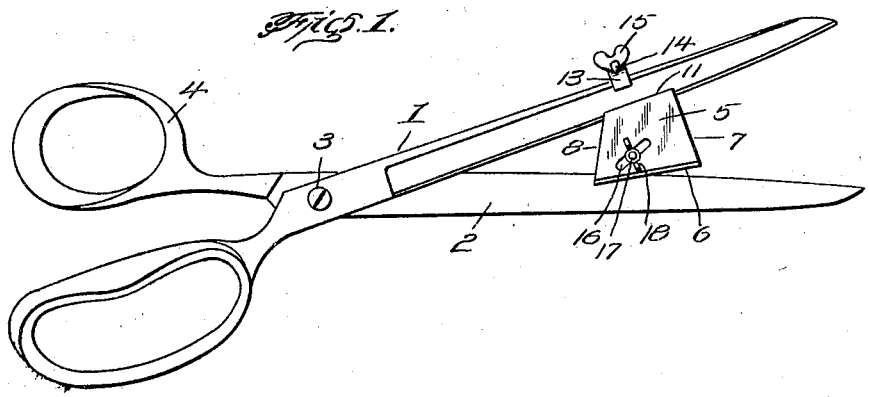
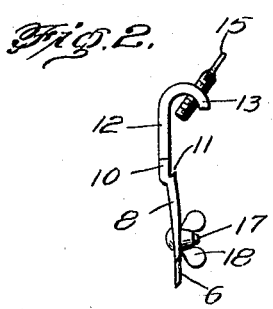
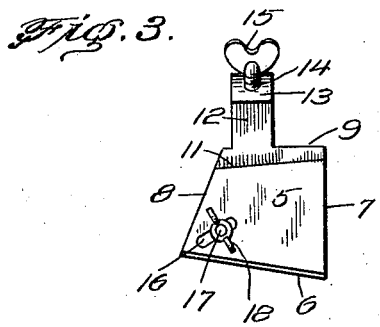
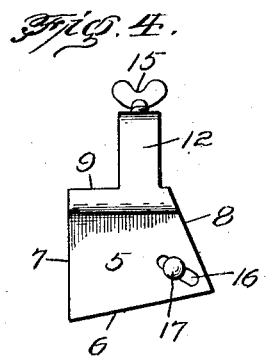
INVENTOR.
L. P. Van Hall and
C. L. Martin.
BY
Geo. P. Kimmel
ATTORNEY.

Patented Apr. 1, 1924.

1,489,176

UNITED STATES PATENT OFFICE.

LEO P. VAN HALL AND CHARLES LESTER MARTIN, OF ST. JOSEPH, MISSOURI.

BUTTONHOLE-CUTTING ATTACHMENT.

Application filed April 13, 1923. Serial No. 631,824.

*To all whom it may concern:*

Be it known that we, LEO P. VAN HALL and CHARLES LESTER MARTIN, citizens of the United States, residing at St. Joseph, in the county of Buchanan and State of Missouri, have invented certain new and useful Improvements in Buttonhole-Cutting Attachments, of which the following is a specification.

This invention relates to a button-hole cutting attachment for scissors or shears, and has for its object to provide, in a manner as hereinafter referred to, an attachment of such class, with means whereby provision is had for adjustably connecting the attachment with blades of varying widths and further providing the attachment with means for adjustably setting the same to provide for cutting button-holes of varying lengths.

Further objects of the invention are to provide a button-hole cutting attachment for scissors or shears, which is simple in its construction and arrangement, strong, durable, compact, readily connected to and adjusted with respect to the blade of a pair of scissors or shears, efficient and convenient in its use and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is an elevation of a pair of scissors, showing the adaptation with one of the blades thereof of a button-hole cutting attachment in accordance with this invention.

Figure 2 is an edge view of the attachment.

Figure 3 is a front elevation of the attachment.

Figure 4 is a rear elevation of the attachment.

Referring to the drawings in detail, 1 and 2 denote the blades of a pair of scissors, and which are pivotally connected together, as at 3, and each of which is provided with a handle member 4.

A button-hole cutting attachment for scissors or shears in accordance with this invention comprises a blade of scalene contour and which is indicated at 5, and formed with a cutting edge 6, a forward edge 7, a follower edge 8 and a top edge 9. The cutting edge 6, inclines downwardly from the edge 8 to the edge 7. The edge 8 inclines forwardly from the edge 6 to the edge 9. The edges 7 and 9 are disposed at right angles with respect to each other.

The blade 5, at a point removed from its upper edge 9, is offset as at 10, and in a manner to provide a beveled seat 11 which extends at an inclination in an opposite direction with respect to the edge 6. The seat 11 extends at a slight upward inclination from its inner to its outer terminus, whereby when the attachment is mounted in position the seat will overlap that edge of the blade of the scissors to which the attachment is connected.

Formed integral with the top edge 9 of the blade 5, at a point between the transverse center of said edge 9 and the rear end thereof, is a vertically disposed inverted hook-shaped coupling member formed of a narrow vertical shank 12 terminating at its upper end in a right angularly disposed hook 13 of arcuate contour and with the free end or bill of the hook opposing the upper terminal portion of the shank 12.

The hook 13 of the member 12 is formed with an opening 14; is disposed at an inclination and which has the wall thereof threaded, and threadedly engaging with the wall of the opening 14 is a downwardly inclined adjustable clamping screw 15.

The blade 5 is formed with a diagonally disposed slot 16, which extends from a point in close proximity to the rear end of the cutting edge 6 and which further extends in a direction towards the corners formed respectively by the intersection of the edges 6 and 8 and the edges 7 and 9. Extending through the slot 16 is a controlling element 17 for regulating the length of the cut, and said element constitutes what may be termed an adjustable gage whereby the length of the cut of the button-hole can be regulated. The element 17 consists of a head and a shank, and with the head arranged against the rear face of the blade 5. The shank extends through the slot 16 and is provided with peripheral threads for the reception of a thumb nut 18, whereby the element 17 can be clamped in position. The element 17 is adjustable lengthwise of the slot 16 for the purpose of regulating the length of the cut and the head of the element 17 acts as an abutment to limit the cutting movement of the blade 2 during the operation of the cutting of a button-hole. The edge 6 of the blade 5 cooperates with the edge of the blade 2 for cutting the button-hole, but as before stated the cutting movement of the blade 2 is limited by the head of the element 17 which constitutes an abutment.

When the attachment is set up, the coupling member 12 is positioned at the rear of the blade 1, and the cutting edge of the blade 1 is mounted against the beveled seat 11. The hook 13 of the coupling member 12 overlaps the outer edge of the blade 1, as shown in Figure 1. The clamping screw 15 is then adjusted to contact with the blade 1 and in connection with the seat 11 provides means whereby the attachment is clamped in position to said blade and with the latter positioned to extend between the seat 11 and the hook 13 of the coupling member 12. The clamping screw 15 is set at an angle with respect to the blade 5, as well as at an angle with respect to the blade 1, and when it is in clamping position, it exerts a side-wise and a downward pressure thus securely clamping the blade 1 against the seat 11 of the blade 5.

The blade 5, from the seat 11, is curvilinear in vertical section so as to provide for the cutting edge 6 to extend towards the cutting edge of the blade 2.

As the attachment is adjustably secured in position with respect to the blade 1, it can be positioned at any desired point with respect to the length of the blade 1, and as the element 17 is adjustable lengthwise of the slot 16, provision is had for cutting button-holes of different lengths depending on the position of the element 17 in the slot 16, and as the slot 16 is disposed diagonally with respect to the blade 5, it provides for an accurate adjustment of the gage.

Although the preferred embodiment of the attachment in accordance with this invention and for the purpose set forth is as described and illustrated, yet it is to be understood that changes in the details of construction can be had which will fall within the light of the invention as claimed.

What we claim is:—

1. A button-hole cutting attachment for scissors comprising a scalene-shaped blade formed with a lower cutting edge inclining downwardly from its rear to its front end and further provided with a diagonally disposed slot leading from a point in close proximity to one end of said edge and in alinement with the lower rear and upper forward corner of the blade, a gage element adjustably secured in said slot, and means extended upwardly from the rear part of the upper edge of the blade for detachably connecting it with a scissors blade.

2. A button-hole cutting attachment for scissors comprising a blade formed with a lower inclined cutting edge and further provided with a diagonally disposed slot leading from a point in close proximity to one end of said edge, a gage element adjustably secured in said slot, said blade offset to provide an inwardly beveled seat, and means extended upwardly from the upper edge of the blade and in connection with said seat for detachably connecting the blade with a scissors blade.

3. A button-hole cutting attachment for scissors comprising a lower blade of scalene contour and formed with a cutting edge extending downwardly at an inclination from the rear to the forward edge of the blade, said blade offset near its upper end to provide a beveled seat extending from the rear to the forward edge of the blade at an upward inclination, a coupling member integral with upper edge of said blade, and adjustable means threadedly engaging with said coupling member for abutment against a scissors blade and in connection with said seat detachably securing the blade to the scissors blade.

4. A button-hole cutting attachment for scissors comprising a lower blade of scalene contour and formed with a cutting edge extending downwardly at an inclination from the rear to the forward edge of the blade, said blade offset near its upper end to provide a beveled seat extending from the rear to the forward edge of the blade at an upward inclination, a coupling member integral with upper edge of said blade, and adjustable means threadedly engaging with said coupling member for abutment against a scissors blade and in connection with said seat detachably securing the blade to the scissors blade, said seat inclining upwardly towards its outer edge.

5. A button-hole cutting attachment for scissors comprising a lower blade of scalene contour and formed with a cutting edge extending downwardly at an inclination from the rear to the forward edge of the blade, said blade offset near its upper end to provide a beveled seat extending from the rear to the forward edge of the blade at an upward inclination, a coupling member integral with upper edge of said blade, and adjustable means threadedly engaging with said coupling member for abutment against a scissors blade and in connection with said seat detachably securing the blade to the scissors blade, said means carried by said coupling member disposed at an angle with respect to said blade.

6. A button-hole cutting attachment for scissors comprising a blade provided with a lower cutting edge and a seat in one side thereof extending from its rear to its front edge, a vertical shank integral with the top edge of the blade, a hook integral with and extending at right angles to the upper terminus of the shank, an inclined abutment screw extending through and threadedly engaging with the bill of the hook for abutment against a scissors blade and in connection with the hook and seat detachably securing the blade to the scissors blade.

7. A button-hole cutting attachment for scissors comprising a blade provided with a lower cutting edge and a seat in one side thereof extending from its rear to its front edge, a vertical shank integral with the top edge of the blade, a hook integral with and extending at right angles to the upper terminus of the shank, an inclined abutment screw extending through and threadedly engaging with the bill of the hook for abutment against a scissors blade and in connection with the hook and seat detachably securing the blade to the scissors blade, said blade provided in proximity to the rear lower corner thereof with a diagonally disposed slot in alinement with the lower rear and upper forward corner of the blade, and an adjustable gage mounted in said slot and including means for fixedly securing it in adjusted position.

In testimony whereof, we affix our signatures hereto.

LEO P. VAN HALL.
CHARLES LESTER MARTIN.